(12) United States Patent
Zhang et al.

(10) Patent No.: US 8,250,198 B2
(45) Date of Patent: Aug. 21, 2012

(54) CAPACITY PLANNING FOR DATA CENTER SERVICES

(75) Inventors: Ming Zhang, Redmond, WA (US);
Paramvir Bahl, Bellevue, WA (US);
Ying Zhang, Ann Arbor, MI (US); Z. Morley Mao, Ann Arbor, MI (US)

(73) Assignee: Microsoft Corporation, Redmond, WA (US)

( * ) Notice: Subject to any disclaimer, the term of this patent is extended or adjusted under 35 U.S.C. 154(b) by 221 days.

(21) Appl. No.: 12/539,802

(22) Filed: Aug. 12, 2009

(65) Prior Publication Data

US 2011/0040876 A1    Feb. 17, 2011

(51) Int. Cl.
*G06F 15/173* (2006.01)
(52) U.S. Cl. ........ 709/223; 709/200; 709/224; 709/225; 709/226
(58) Field of Classification Search ................ 709/200, 709/221–226
See application file for complete search history.

(56) References Cited

U.S. PATENT DOCUMENTS

| | | | | |
|---|---|---|---|---|
| 5,781,449 | A * | 7/1998 | Rosborough | 709/224 |
| 6,308,211 | B1 * | 10/2001 | Rosborough et al. | 709/224 |
| 6,393,480 | B1 * | 5/2002 | Qin et al. | 709/224 |
| 6,493,754 | B1 * | 12/2002 | Rosborough et al. | 709/224 |
| 6,587,938 | B1 * | 7/2003 | Eilert et al. | 712/29 |
| 6,885,641 | B1 | 4/2005 | Chan et al. | |
| 7,146,353 | B2 * | 12/2006 | Garg et al. | 1/1 |
| 7,210,073 | B1 * | 4/2007 | Landwehr et al. | 714/47.2 |
| 7,594,016 | B1 * | 9/2009 | Zhou et al. | 709/226 |
| 7,747,726 | B2 * | 6/2010 | Thoennes et al. | 709/223 |
| 2002/0110091 | A1 * | 8/2002 | Rosborough et al. | 370/252 |
| 2004/0128346 | A1 * | 7/2004 | Melamed et al. | 709/203 |
| 2005/0021530 | A1 * | 1/2005 | Garg et al. | 707/100 |
| 2005/0102398 | A1 * | 5/2005 | Zhang et al. | 709/225 |
| 2005/0154576 | A1 * | 7/2005 | Tarui et al. | 703/22 |
| 2005/0240935 | A1 | 10/2005 | Ramanathan | |
| 2006/0190236 | A1 * | 8/2006 | Malloy et al. | 703/22 |
| 2007/0067296 | A1 * | 3/2007 | Malloy et al. | 707/8 |
| 2008/0071906 | A1 * | 3/2008 | Thoennes et al. | 709/224 |
| 2008/0172312 | A1 * | 7/2008 | Synesiou et al. | 705/34 |
| 2008/0221941 | A1 | 9/2008 | Cherkasova et al. | |
| 2008/0235705 | A1 * | 9/2008 | Bivens et al. | 718/105 |
| 2008/0263563 | A1 * | 10/2008 | Diao et al. | 718/105 |
| 2009/0055823 | A1 | 2/2009 | Zink et al. | |

(Continued)

OTHER PUBLICATIONS

Dorsey et al. (Dulcian Inc., Performance tuning web applications, May 2009) Urgaonkar et al. (University of Massachusetts, Sep. 2006).*

(Continued)

*Primary Examiner* — Emmanuel L Moise
*Assistant Examiner* — Waseem Ashraf
(74) *Attorney, Agent, or Firm* — Lee & Hayes, PLLC

(57) ABSTRACT

Techniques and systems for providing capacity planning for data center services are disclosed herein. In some aspects, a multi-tier service is analyzed to determine a query response time (QRT) that can be used for resource planning or other service management reasons. The QRT may include a front end (FE) response time of FE servers and a back end (BE) response time of BE servers, where the BE servers are partitioned servers, and where the response times are based on various request rates from users. In various aspects, the QRT may include a network transmission time of data transmitted between an end user and each tier. In further aspects, the FE response time may be modeled using a single server queuing model while the BE response time may be modeled using a simulation or regression analysis.

19 Claims, 8 Drawing Sheets

U.S. PATENT DOCUMENTS

| | | | |
|---|---|---|---|
| 2009/0113042 A1* | 4/2009 | Bivens et al. | 709/224 |
| 2009/0113323 A1 | 4/2009 | Zhao et al. | |
| 2010/0125755 A1* | 5/2010 | Hoeflin et al. | 714/37 |
| 2010/0228650 A1* | 9/2010 | Shacham et al. | 705/34 |
| 2011/0004885 A1* | 1/2011 | Kikuchi et al. | 718/104 |

OTHER PUBLICATIONS

Urgaonkar et al. (An anlytical Model for multi-tier Internet services, University of Massachusetts, Sep. 8, 2006).*

Dorsey et al. (Performance Tuning Web Applications, Dulcian Inc., May 2009).*

Abdelzaher, et al., "Performance Guarantees for Web Server End-Systems: A Control-Theoretical Approach", IEEE Transactions on Parallel and Distributed Systems, Jan. 2002, vol. 13, No. 1, pp. 80-96, retrieved from the internet at http://www.cs.virginia.edu/papers/00980028.pdf, pp. 80-96.

Arlitt, et all, "Workload Characterization of the 1998 World Cup Web Site", Hewlett-Packard Company, 1999, retrieved from the internet at http://www.hpl.hp.com/techreports/1999/HPL-1999-35R1.pdf, 90 pgs.

Chandra, et al., "Dynamic Resource Allocation for Shared Data Centers Using Online Measurements", Jt Intl Conf on Measurement andModeling of Computer Systems, Proceedings 2003 ACM SIGMETRICS Intl Conf, 2003, retrieved from the internet at http://www-users.cs.umn.edu/~chandra/papers/iwqos03/paper.pdf, 18 pgs.

Chase, et al., "Manging Energy and Server Resources in Hosting Centers", ACM SIGOPS Operating Systems Review, vol. 35, Issue 5, Dec. 2001, retrieved from the internet at http://www.cs.duke.edu/ari/publications/muse.pdf, 14 pgs.

Doyle, et al., "Model-Based Resource Provisioning in a Web Service Utility", Proceedings 4th Conf on USENIX Symposium on Internet Technologies and Systems, Mar. 2003, retrieved from the internet at http://cseweb.ucsd.edu/~vahdat/papers/mbrp-usits03.pdf, 14 pgs.

"DynaServer: System Support for Dynamic Content Web Servers", retrieved from the internet on Jun. 22, 2009 at http://www.cs.rice.edu/CS/Systems/DynaServer/, 2 pgs.

Gmach, et al., "Capacity Management and Demand Prediction for Next Generation Data Centers", IEEE International Conference on Web Services, ICWS 2007, retrieved from the internet at http://ieeexplore.ieee.org/stamp/stamp.jsp?arnumber=04279581, 8 pgs.

Hellerstein, et al., "An Approach to Predictive Detection for Service Management", Integrated Network Management, 1999, Distributed Management for the Networked Millinnium, Proceedings 6th IFIP/IEEE Intl Symposium, May 1999, retrieved from the internet at http://ieeexplore.ieee.org/stamp/stamp.jsp?arnumber=00770691, pp. 309-322.

Kamra, et al., "Yaksha: A Self-Tuning Controller for Managing the Performance of 3-Tiered Web Sites", 12th IEEE Intl Workshop on Quality Service, 2004, IWQOS Jun. 2004, retrieved from the internet at http://dna-pubs.cs.columbia.edu/citation/paperfile/59/iwqos04-yaksha.pdf, 10 pgs.

"Kernel TCP Virtual Server", KTCPVS Software, Application Level Load Balanceing, retrieved from the internet Jun. 22, 2009 at http://www.linuxvirtualserver.org/software/ktcpvs/ktcpvs.html, 4 pgs.

Menasce, "Web Server Software Architectures", Internet Computing, IEEE, vol. 7, Issue 6, Nov.-Dec. 2003, retrieved from the internet at http://www.cs.gmu.edu/~menasce/it809/Fall01/web-software-arch.pdf, 14 pgs.

"Oracle 9i Database", retrieved from the internet Jun. 22, 2009 at http://www.oracle.com/technology/products/oracle9i, 1 pgs.

Pacifici, et al., "Performance Management for Cluster Based Web Services", IEEE Journal on Selected Areas in Communications, Dec. 2005, vol. 23, Issue 12, retrieved from the internet at http://www.research.ibm.com/autonomic/research/papers/pacifici_TechReport.pdf, pp. 1-17.

Ranjan, et al., "QoS-Driven Server Migration for Internet Data Centers", In Proceedings of IWQOS 2002, 10th IEEE Intl Workshop on Quality Service, retrieved from the internet at http://networks.rice.edu/papers/RRFK02.pdf, 10 pgs.

Reiser, et al., "Mean-Value Analysis of Closed Multichain Queuing Networks", Journal of the Association for Computing Machinery, vol. 27, No. 2, Apr. 1980, retrieved from the internet at http://delivery.acm.org/10.1145/330000/322195/p313-reiser.pdf?key1=322195&key2=8150665421&coll=GUIDE&dl=GUIDE&CFID=40725857&CFTOKEN=32976865, pp. 313-322.

Slothouber, "A Model of Web Server Performance" 5th International World Wide Web Conference, Jun. 1995, retrieved from the internet at http://www.geocities.com/webserverperformance/modelpaper.html, 16 pgs.

"Sysstat Package", retrieved from the internet Jun. 22, 2009 at http://freshmeat.net/projects/sysstat, 9 pgs.

Urgaonkar, et al., "An Analyticall Model for Mult-tier Internet Services and Its Applications", ACM Transactions on the Web (TWEB), vol. 1, No. 1, May 2007, retrieved from the internet at http://lass.cs.umass.edu/papers/pdf/TR04-99.pdf, 13 pgs.

Urgaonkar, et al., "Cataclysm: Handling Extreme Overloads in Internet Services", Proceedings 23rd annual ACM Symposium on Primciples of Distributed Computing, 2004, retrieved from the internet at http://lass.cs.umass.edu/papers/pdf/TR03-40.pdf, 16 pgs.

Villela, et al., "Provisioning Servers in the Application Tier for E-Commerce Systems", ACM Transactions on Internet Technology, vol. 7, No. 1, Article 7, Feb. 2007, retrieved from the internet at http://delivery.acm.org/10.1145/1190000/1189747/p1-villela.pdf?key1=1189747&key2=9950665421&coll=GUIDE&dl=GUIDE&CFID=40726085&CFTOKEN=53577928, 23 pgs.

Welsh, et al., "Adaptive Overload Control for Busy Internet Servers", In USENIX Symposium on Internet Technologies and Systems, 2003, retrieved from the internet at http://www.eecs.harvard.edu/~mdw/papers/control-usits03.pdf, 14 pgs.

Zhang, et al., "A Capacity Planning Framework for Multi-tier Enterprise Services with Real Workloads", Proc of 10th IFIP/IEEE Symposium on Itergrated Management, May 2007, retrieved from the internet at http://www.hpl.hp.com/personal/Lucy_Cherkasova/papers/capriccio-4p.pdf, 4 pgs.

Kleinrock, "The Queue M/G/1", Book Chapter 5, Queueing Systems, vol. 1: Theory, John Wiley and Sons, Inc., 1975, pp. 167-240.

Lazowska, "Quantitative System Performance", Book Chapters 2, 3, 4 and 5, Prentice-Hall, 1984, pp. 20-97.

* cited by examiner ies. Planners currently lack
CAPACITY PLANNING FOR DATA CENTER SERVICES

BACKGROUND

Today's large scale online services such as Web search services and e-commerce services often include many servers distributed among various locations at data centers. These servers may receive and fulfill hundreds of thousands of requests from users each day. A typical large scale service has a multi-tier architecture to achieve performance isolation and facilitate systems management. Within each tier, servers may be replicated and/or partitioned to enable scalability, load balance, and enhance reliability.

Because of the complexity of these large scale online services, planners often find it difficult to predict service performance when the large scale services experience a reconfiguration, disruption, or other changes. Planners currently lack adequate tools to identify and measure service performance, which may be used to make strategic decisions about the services.

SUMMARY

Techniques and systems for providing capacity planning for data center services are disclosed herein. In some aspects, a multi-tier service is analyzed to determine a query response time (QRT) that can be used for resource planning or other service management reasons.

In some embodiments, the QRT may include a front end (FE) response time of FE servers and a back end (BE) response time of BE servers by which the response times are based on various request rates from users. In various embodiments, the FE servers may have the FE response time modeled using a single server queuing model. The BE servers may be partitioned servers, and thus render a queuing model impractical. The BE servers may have the BE response time determined using a simulation model and/or by regression analysis of historical data. In some embodiments, the QRT may include a network transmission time of data transmitted between an end user and each tier.

In accordance with various embodiments, an optimization process may be performed on the multi-tier service to determine impacts of a change in resource allocation of servers in the multi-tier service. In addition, the optimization process may also provide information to planners regarding possible scenarios such as a failure of resources and a resulting response time when the service experiences a flash crowd.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
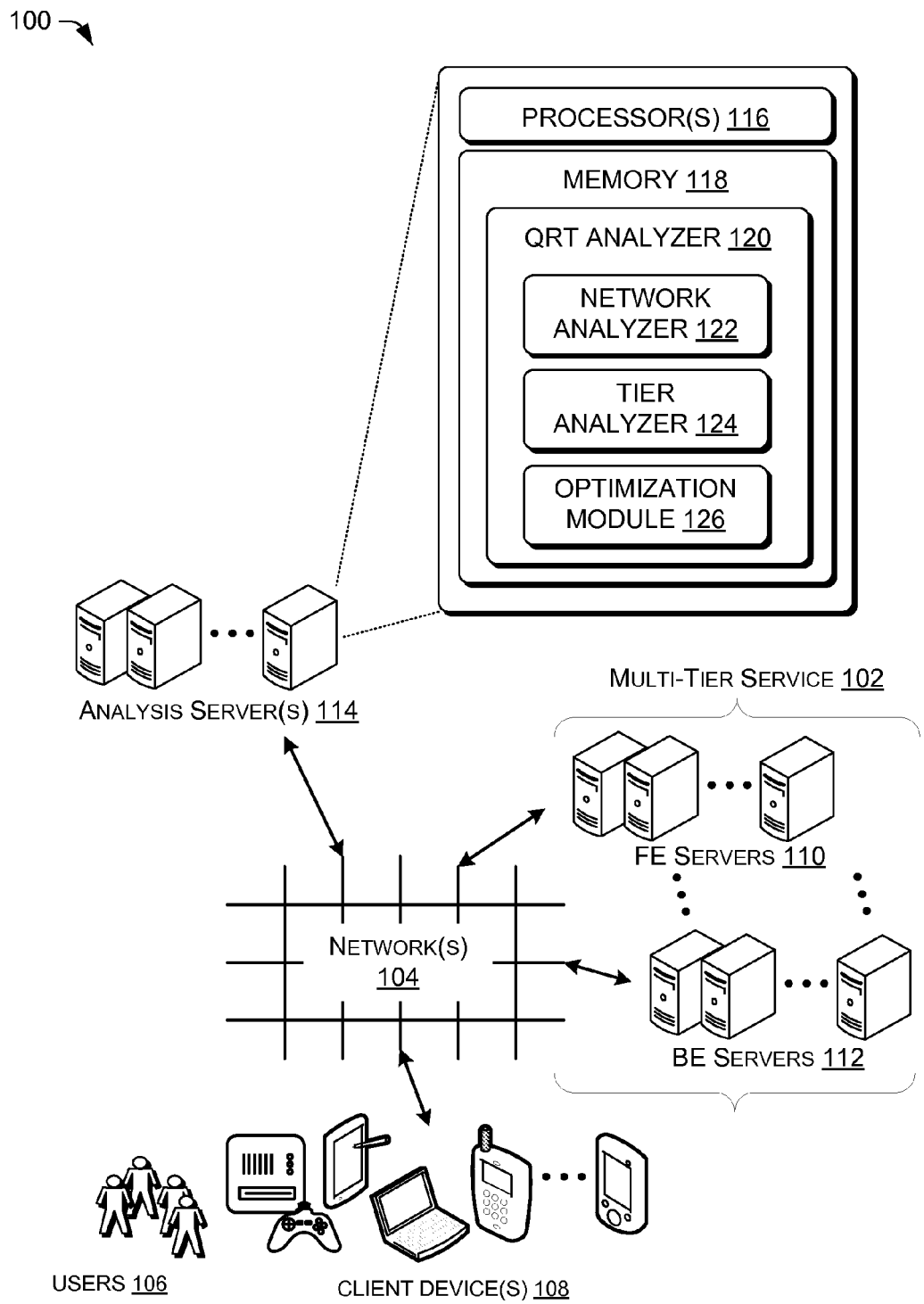
FIG. 1 is a schematic diagram of an illustrative environment where a server analyzes a network and a multi-tier service to enable capacity planning for data center services in accordance with various embodiments of capacity planning for data center services.

As discussed above, large scale services make analysis of service performance a complex and tedious undertaking. Techniques and systems are disclosed herein to observe and model large scale online services to determine and predict response times at various request rates (e.g., high volume, low volume, etc.). In some embodiments, each tier of a multi-tier service may be individually modeled to determine an anticipated response time for the respective tier.

Each tier may include many servers that perform a subset of functions of the service such as front end (FE) operations and back end (BE) operations. Tiers may be partitioned across multiple servers when the function of the tier requires additional scaling, such as for large search indexing and other large data sources.

Non-partitioned tiers may include front end (FE) servers that may provide tasks such as query normalization, security checks, request redirection, and content assembly, among other possible tasks. The FE servers may be modeled using single server queuing to predict a response time based on a given request rate.

Partitioned tiers may include back end (BE) servers. The BE servers may provide core functionalities, such as core search capabilities that include query parallelization, index matching, and document retrieval, among other possible tasks. The BE servers may be modeled using simulation, regression analysis, or other techniques to approximate response times of the BE servers during various request rates.

In addition to response times for each tier, network transmission times may be measured during various request rates to enable calculation of aggregate response times of a request from initiation of the request (e.g., from a user on a client device) to fulfillment of the request from the service back to the user. In some instances, the network transmission time may be subdivided to include intermediary times when data is transferred between data centers (DCs), such as when the FE servers are located apart from the BE servers that are used to fulfill a request.

As used herein, response time and processing time may be used interchangeably to represent an amount to time for a service (or portion thereof) to receive a request and then fulfill the request. For example, the response time may include time that is required for manipulation of data, delays, or other time by which the service is unavailable to perform other tasks between the request and fulfillment of the request. Thus, the response time is indicative of the amount of time for a resource (e.g., server) to receive a request and then fulfill the request via a response to a client device.

By isolating the response times for network transmissions and each tier, planners may be empowered to make informed decisions regarding changes to large scale services such as resource allocation, redirection of request, and so forth. In addition, planners may be able to better understand implications to a service when anomalous events occur such as a flash crowd (i.e., substantially instantaneous large demand of a service), failure of resources (e.g., power outage, server crash, etc.), or deployment of a new DC.

Although large scale services may be implemented to perform any number of different services (e.g., Web search, e-commerce, e-mail, etc.), the disclosure provides illustrative examples using Web search. However, the techniques and systems may be implemented to large scale online services that perform any of the aforementioned different services or any other services that are implemented in large scale systems.

The process and systems described herein may be implemented in a number of ways. Example implementations are provided below with reference to the following figures.

Illustrative Environment

FIG. 1 is a schematic diagram of an illustrative environment 100 in which a server analyzes a network and a multi-tier service to enable capacity planning for data center services. The environment 100 includes a multi-tier service 102 in connection with a network 104 such as the Internet. The multi-tier service 102 may provide data to a variety of users 106 via client devices 108. The multi-tier service 102 may include search engines, e-commerce websites, social networking sites, news or entertainment sites, or anything else that provides online data for consumption by users 106. The multi-tier service 102 may receive requests for data each day, sometimes ranging upwards of millions of requests. Each request may be fulfilled in as efficient a manner as possible to satisfy the requests of the users 106.

The multi-tier service 102 may be hosted on many different data centers (DCs), which may be distributed across a large geography or the globe (and connected by the network 104). One reason the multi-tier service 102 may use multiple DCs is to select DCs that are close to the end users 106 to minimize latency in fulfillment of data requests. DCs are often located near large populations (e.g., large urban areas) for this reason. In addition, a site selection of a DC often takes into consideration locations where resources (energy) are relatively cheaper than other locations. Because of deployment of multiple DCs for the multi-tier service 102, requests may be fulfilled from different locations.

The multi-tier service 102 may have a multi-tier architecture that includes front end (FE) server(s) 110 and back end (BE) server(s) 112. The FE servers 110 and BE servers 112 may be geographically located together in some instances and apart in other instances. For example, at a first location, both the FE servers 110 and the BE servers 112 may be located together while a second location may only include the FE servers and a third location may only include the BE servers, however other configurations are possible. To satisfy a request of one of the users 106, the request may follow a general flow from a respective one of the client devices 108, to the FE server 110, to the BE server 112, and finally back to the user 106 via the client device 108. As discussed herein, any reference to "the client devices 108" may include a respective one or more of the client devices.

The FE servers 110 may include various replications to enable the FE servers to scale to meet an anticipated or required workload. Each replication may be limited to a single partition that is processed by a single server. The BE servers 112 may include various partitions to enable processing of large amounts of data, such as search data that includes large indexes and data that may not be capable of processing using a single server. In addition, the BE servers 112 may include various replications of each of the partitions to scale to meet a workload.

As noted above, the users 106 may connect with the multi-tier service 102 via the client device 108. The client device 108 may be a server, a desktop computer, a tablet, a mobile computer, a mobile telephone, a gaming console, or a music player, among other possible client devices. When the user 106 submits a request for data using any one of the client devices 108, the request is transmitted through the network 104.

In accordance with various embodiments, one or more analysis server(s) 114 may observe and interact with the multi-tier service 102 via the network 104. In some embodiments, the analysis servers 114 may determine a response time for each tier of the multi-tier service 102 that includes the FE servers 110 and the BE servers 112. The response time may be determined based on an expected request rate of the tiers of the multi-tier service 102. For example, an observed response rate may be slower when a request rate is high such that a processing queue is long and requires additional time before a request is processed.

In a very basic configuration, one or more of analysis servers 114 may include one or more processors ("processors") 116 and system memory 118. Depending on the exact configuration and type of server, system memory 118 may be volatile (such as RAM), non-volatile (such as ROM, flash memory, etc.) or some combination of the two. System memory 118 may include a query response time (QRT) analyzer 120 to perform the functions described herein.

In various embodiments, the QRT analyzer 120 may include a network analyzer 122 to measure network transmission time between the client devices 108, the FE servers 110, and the BE servers 112.

In accordance with some embodiments, the QRT analyzer 120 may include a tier analyzer 124 to simulate models and/or identify functions (for example by regression analysis) to determine a response time for each tier based on a request rate. In various embodiments, the tier analyzer 124 may model some tiers using queuing algorithms to calculate the response time. The QRT analyzer 120 may calculate an aggregate response time that includes response times of each tier and network transmission time based on a given request rate.

In some embodiments, the QRT analyzer 120 may include an optimization module 126 to enable modification to the multi-tier service 102 to reduce the response time or identify possible service performance levels based on various request rate inputs, thus enabling planners to more clearly understand service capabilities of the multi-tier service 102.

Illustrative Operation

Figure 2:
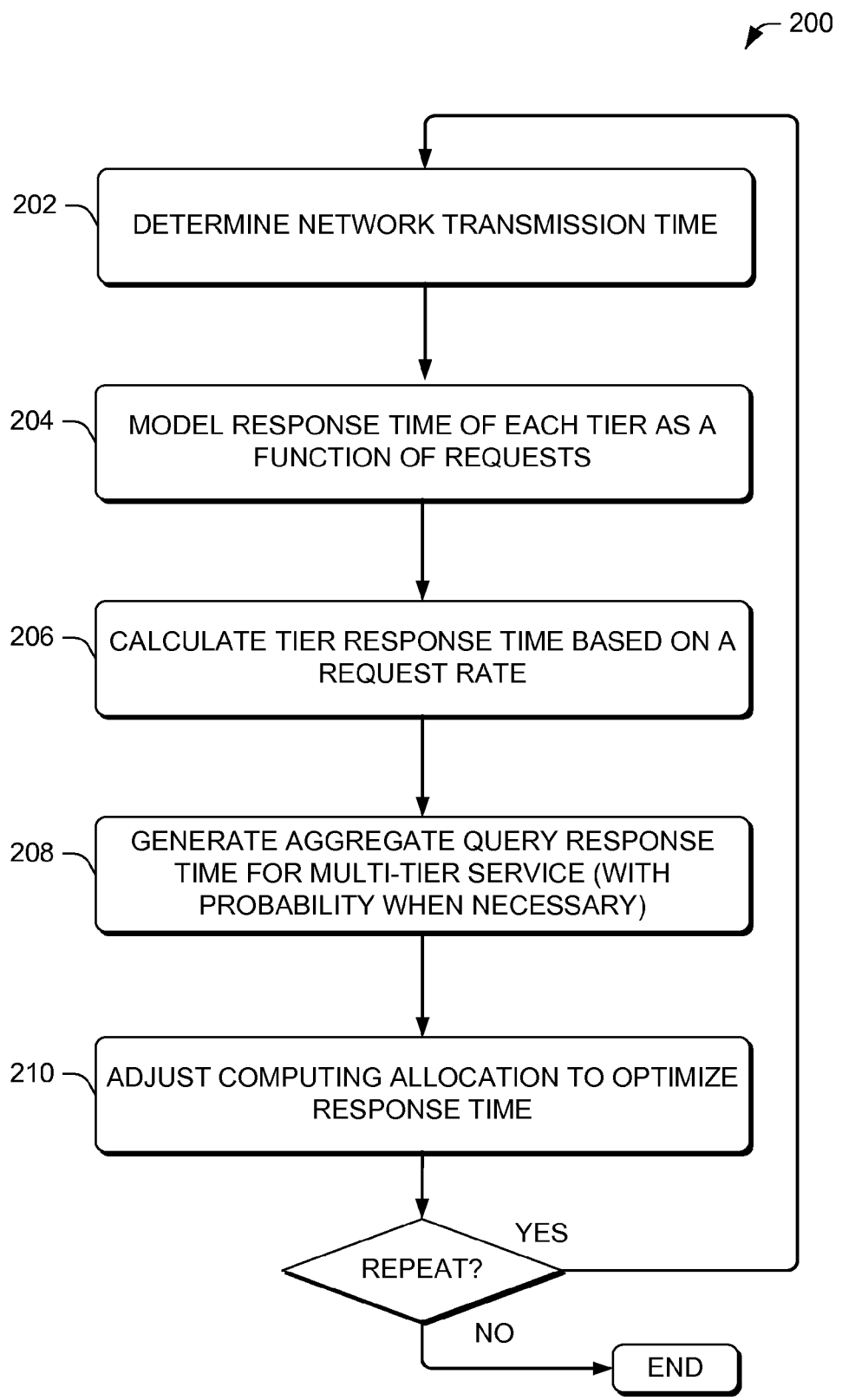
FIG. 2 is a flow diagram of an illustrative process of determining a response time of the multi-tier service in accordance with some embodiments of the disclosure.

FIG. 2 is a flow diagram of an illustrative process 200 of determining a response time of the multi-tier service. The process 200 is illustrated as a collection of blocks in a logical flow graph, which represents a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly. The process 200 will be discussed with reference to the environment 100 of FIG. 1.

At 202, the network analyzer 122 may determine a network transmission time. The network transmission time may include one or more time elements representative of data transfer times between any one of the client devices 108, the FE servers 110, and/or the BE servers 112.

At 204, the tier analyzer 124 may model the response time of each tier as a function of a request rate. For example, the FE servers 110 may be modeled using a queuing function (e.g., single server, etc.) while the BE servers 112 may be modeled using a simulation, regression analysis, or other techniques.

At 206, the tier analyzer 124 may calculate one or more response times for the FE servers 110 and the BE servers 112 based on a request rate. In some embodiments, the response rate may be further subdivided by partition for each of the BE servers 112.

At 208, the QRT analyzer 120 may aggregate a query response time (QRT) for the multi-tier service 102. The QRT may include the network transmission times determined at the operation 202 and the tier response times calculated at the operation 206. In some instances, the QRT analyzer 120 may include a probability factor when calculating the QRT. The probability factor may reduce (or possibly lengthen) response times during special occurrences such as when a tier can fulfill a request using cached data (which is typically faster than running a query), and so forth.

At 210, the optimization module 126 may adjust computing allocation of the multi-tier service 102 to optimize a response time. For example, the optimization module may reroute traffic from a first DC that includes the FE servers 110 to a second DC having the FE servers with a shorter queue such that the cumulative response time for the FE servers that includes the network transmission time is less for the rerouted traffic. In other examples, the optimization module 126 may perform cost/benefit analysis of adding one or more servers to tiers of the multi-tier service 102, which may include identification of a preferred location of the additional server(s). These optimizations and others will be described below in further detail.

Figure 3:
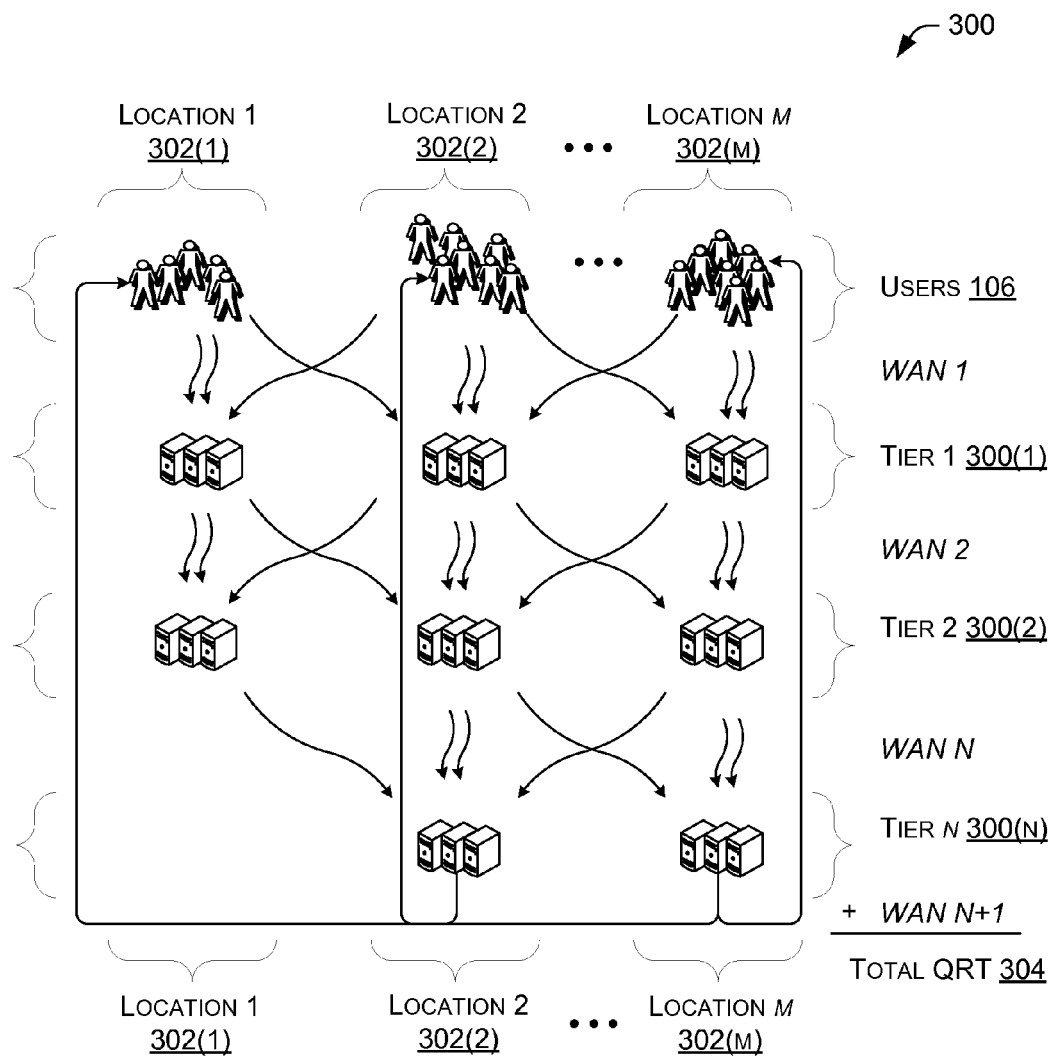
FIG. 3 is a schematic diagram of illustrative tiers and data routing between tiers of the multi-tier service in accordance with one or more embodiments of the disclosure.

FIG. 3 is a schematic diagram of illustrative tiers 300 and data routing between tiers of the multi-tier service. The tiers 300 shown in FIG. 3 are shown as a simplified representation of the large scale multi-tier service 102 that fulfills requests of the users 106 by processing data at geographically dispersed servers. Again, the process 200 is discussed with reference to the environment 100 of FIG. 1.

The tiers 300 may be located in a plurality of locations 302, which may include a first location 302(1), a second location 302(2), . . . and a last location 302(m). The locations may be geographically distributed across the globe or a smaller region, such as the United States, and so forth. As an example only, the first location 302(1) may be in Oakland, Calif.; the second location 302(2) in Chicago, Ill.; and the last location 302(m) in Boston, Mass.

Each of the locations 302 may include one or more of the tiers 300(1), 300(2), . . . , 300(n) (or collectively "the tiers 300"). The tiers 300 may include a first tier 300(1), which may be the FE servers 110, although other FE servers may be implemented in various tiers of the tiers 300. The tiers 300 may also include a second tier 300(2), . . . , and a last tier 300(n), which in some instances may be the BE servers 112. Not every location necessarily includes each of the tiers 300(1)-(n). For example, the first location 302(1) is shown in FIG. 3 as not including the last tier 300(n).

When the users 106 submit requests at a given request rate, the requests may be routed through the tiers 300 in an order to fulfill the request in an efficient manner. Using optimizations, as discussed in the operation 210 of FIG. 2, the tiers 300 may be configured to provided an optimized response time (e.g., minimized time, cost, etc.) to fulfill requests of all of the users, and thus lower the overall response time of the multi-tier service 102 represented by the tiers 300.

The requests may typically be transmitted over the network 104 (e.g., WAN 1, WAN 2, . . . WAN n+1). Here, WAN 1 through WAN N+1 are used for discussion purposes, however the network 104 may be represented by more or fewer network connections. For example, the tiers 1 to n 300(1)-(n) at Location 2 may be located at a single DC and thus may include negligible network delay when transferring data between the tiers. However, when data is transmitted from one location to a second location, network transmission time may be realized and thus be included in a query response time (QRT) 304.

In some embodiments, a request of one of the users 106 may be transmitted to a location other than a nearest location to the user. For example, a user located in Tucson, Ariz. may have her request transmitted to the location 2 302(2) in Chicago (or even Location (M)) even though she is located closer to location 1 302(1) of Oakland. In this example, the user's request may be routed to Chicago when the response time of the second tier 300(2) in Chicago is of a short duration that offsets any additional network transmission time between Tucson and Chicago (as compared to Tucson to Oakland). In addition, rerouting may occur between the tiers 300 (e.g., between tier 1 300(1) and tier 2 (300(2), etc.) when the additional network transmission time is offset by a reduced response time of a destination tier of the tiers 300.

FIGS. 4-7 provide further details on calculating response times for each of the tiers 300 and any network transmission time to enable a calculation of the QRT 304. FIGS. 8-9 discuss optimizations which may include reallocation of the servers, rerouting, adding servers, or other changes to the multi-tier service 102 that may reduce or change the response times. Each of these figures is discussed with reference to the environment 100 of FIG. 1.

Illustrative Response Time Calculation

Figure 4:
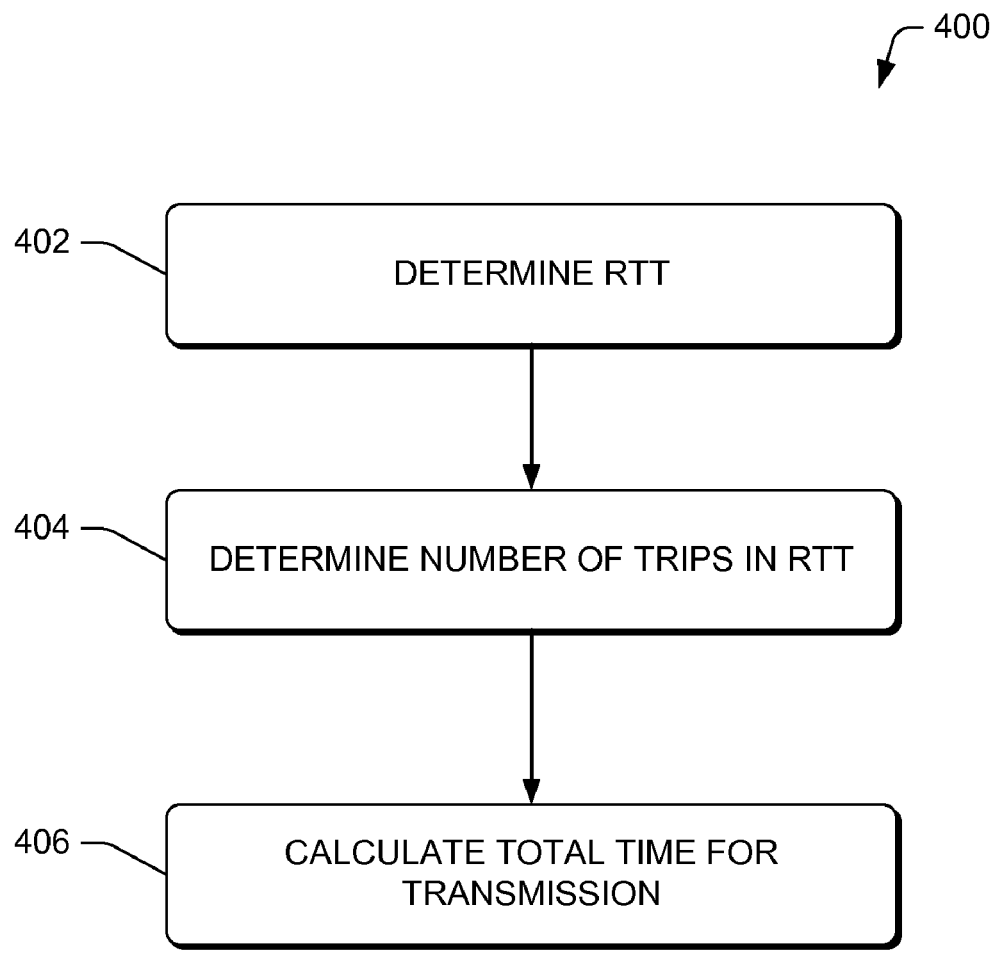
FIG. 4 is a flow diagram of an illustrative process of calculating network transmission time between a node and the multi-tier service in accordance with some embodiments of the disclosure.

FIG. 4 is a flow diagram of an illustrative process 400 of calculating network transmission time between a node and one or more tiers of the multi-tier service.

At 402, the network analyzer 122 may determine a round trip time (RTT) for transmitting a packet of data from a first location to a second location. For example, the RTT may be calculated between the users 106 and each tier of the multi-tier service 102. A request and response (e.g., a search request and a search response) are typically small and can be transmitted individually in single packets.

At 404, the network analyzer 122 may determine a number (n) of trips in the RTT to complete a transmission of data. The actual number of round-trips involved in a transfer depends on the size of a response and TCP congestion window. For example, connections between the tiers 300 may have multiple persistent TCP connections which are actively used for transmitting large volumes of data. Their congestion window sizes are typically kept large enough to transmit an entire request-response pair in one round-trip. However, a transmission between user and the multi-tier service may require multiple round-trips.

At 406, the network analyzer 122 may calculate a total time for a transmission. For example, the transmission time may be expressed as n×RTT for each network TCP connection. Thus, when the multi-tier service includes three tiers, the network transmission time (NTT) may be expressed as follows in Equation 1.

$$NTT=(N_0)(RTT_0)+(N_1)(RTT_1)+(N_2)(RTT_2)+(N_3)(RTT_3) \quad \text{Equ. (1)}$$

Where $RTT_0$ is a network time to transmit the request of the user to the first tier, $RTT_1$-$RTT_2$ are network times between the tiers, and $RTT_3$ is the network time to deliver the response back to the user.

In some embodiments, the network transmission time may be calculated and stored for each unique network transmission (between each tier, the user 106 to the FE servers 110, etc.), which may enable optimizations by redirecting some requests to replications of tiers in remote locations (rather than a closest tier to the requesting user of the users 106).

Figure 5:
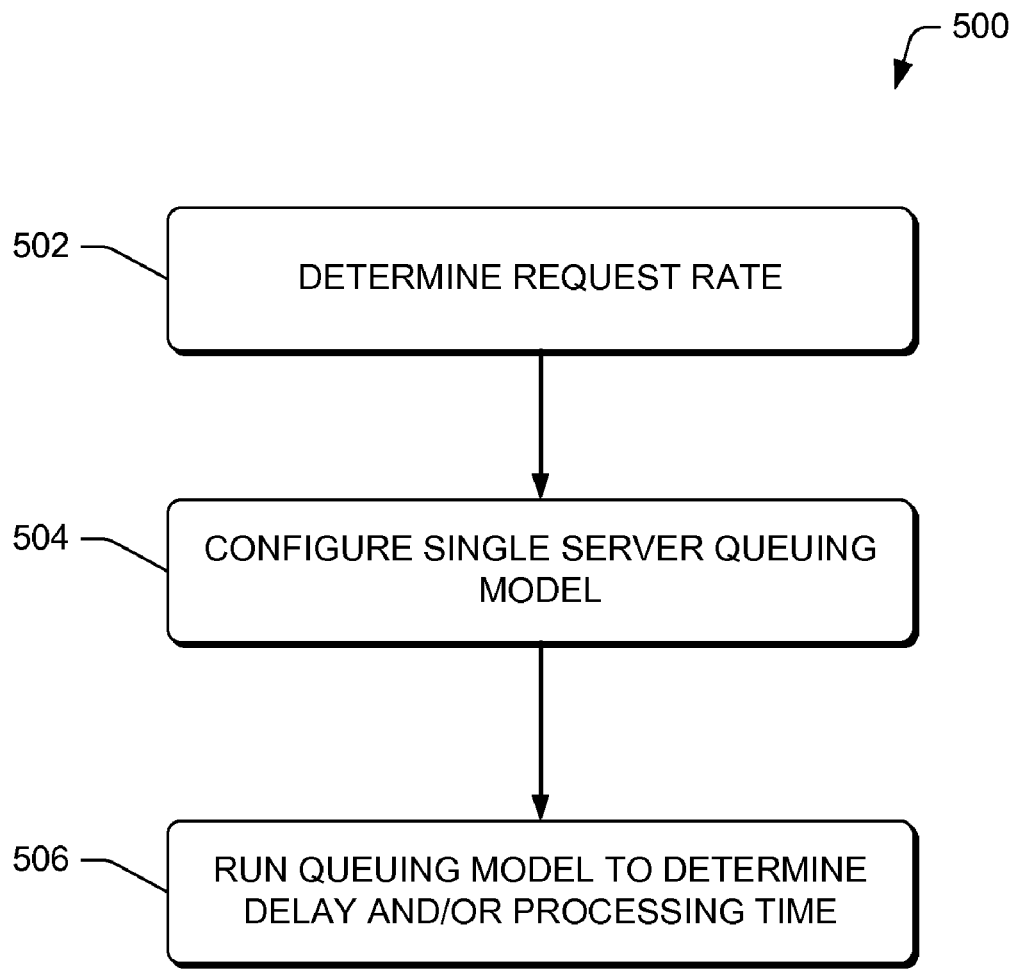
FIG. 5 is a flow diagram of an illustrative process of calculating a response time of a non-partitioned tier in accordance with various embodiments of the disclosure.

FIG. 5 is a flow diagram of an illustrative process 500 of calculating a response time of a non-partitioned tier. As described above, the FE servers 110 may be implemented as a non-partitioned tier. Because each server is substantially identical from a processing perspective, a round robin distribution may be used for allocating work to each server (e.g., allocate to next available server around a cluster of servers).

At 502, the tier analyzer 124 determines an aggregate request rate ($\lambda_{agg}$) and a size (n) of the cluster of servers to model the FE Servers 110. The request rate $\lambda$ of each server is defined by Equation 2.

$$\lambda = \frac{\lambda agg}{n} \quad \text{Equ. (2)}$$

The FE servers 110 are assumed to be substantially identical because they are not partitioned, and thus a single front-end processing time (FPT) model can be used in the model as a single server queue. The response time of the cluster of servers can be estimated using Equation 3.

$$FPT_{agg}(\lambda_{agg})=FPT(\lambda) \quad \text{Equ. (3)}$$

It may be assumed that the workload of each of the FE servers 110 is roughly of equal duration for both the request rate $\lambda$ and for processing (response) time. However, this assumption may not be used for the BE servers 112 for reasons that are discussed below.

At 504, the tier analyzer 124 may configure a single server queuing model. The processing time of one server is estimated using an M/G/1 queue model, which represents a single server with unlimited queue capacity and an infinite calling population. The M/G/1 queue model may assume independent request arrivals whereby an inter-arrival time follows an exponential distribution. The distribution of the processing time may follow any general statistical distribution. The request arrivals of each of the users 106 may not be independent of one another because of user query behavior. Nonetheless, the request arrivals at the FE servers 110 may include requests from many independent users.

In the M/G/1 queue model, the average processing time (PT) of a server is calculated as the sum of service time and queuing time, which is shown in Equation 4.

$$PT(\lambda) = \mu + \mu(1 + cv2)\frac{\rho}{2(1-\rho)} \quad \text{Equ. (4)}$$

In Equation 4, $\mu$ is the average request service time, $c_v$ is the coefficient of variation defined as the ratio of the standard deviation to the mean of the request service time, and $\rho$ measures the workload intensity computed as $\lambda \times \mu$. To calculate $\mu$ and $c_v$, the tier analyzer 124 measures processing time samples of the FE servers 110 at relatively low request rates when there is no queuing in the system. The mean and standard deviation of the processing time samples may be used for $\mu$ and $c_v$. In addition to average processing time, the M/G/1 queue model may also output an average queue length ($q_{len}$).

Finally, at 506, the tier analyzer 124 may run the queuing model to determine delay and/or processing (response) time of the FE servers 110. When the multi-tier service 102 includes multiple non-partitioned tiers (i.e., instances of FE servers 110 that handle different computing tasks), then a unique queuing model may be created and run in accordance with the process 400 for each unique instance of the FE servers.

Figure 6:
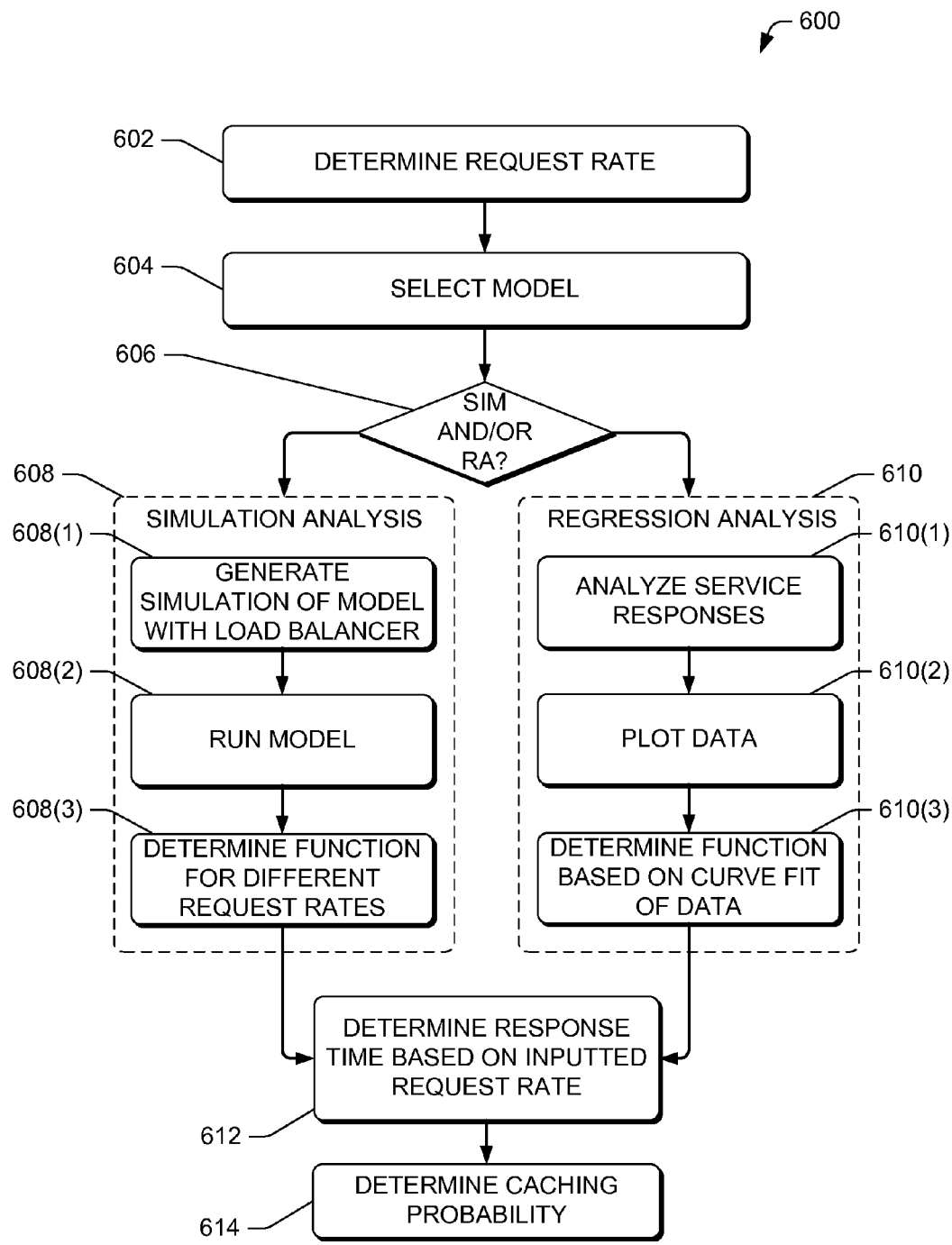
FIG. 6 is a flow diagram of an illustrative process of calculating a response time of a partitioned tier in accordance with some embodiments of the disclosure.

FIG. 6 is a flow diagram of an illustrative process 600 of calculating a response time of a partitioned tier. As described above, the BE servers 112 may be implemented as a partitioned tier having (m) partitions that are used to complete a request for data from one of the users 106.

At 602, the tier analyzer 124 may determine a request rate for the BE servers 112. As an example, the BE servers 112 may be used to store different segments of a search index that is too large to store on a single (non-partitioned) server. Unlike the FE servers 110, the BE servers 112 may include highly variable processing times that make load balance more complex and thus negates the use of the round robin approach. Thus, a customized load balancer may be used by the BE servers 112 to more efficiently allocate work to each of the servers.

In accordance with some embodiments, a request may be serviced by all of the m partitions to acquire complete search results (or other processed data). Within each partition, a load balancer may choose a replication with a minimum expected processing time (e.g., based on a small queue and/or short processing time) as compared to other available servers in the tier. It may be difficult to represent such a BE cluster with traditional queuing models. Because the request arrivals to each queue are inter-correlated, the corresponding queues are dependent, making a use of traditional queuing models impractical.

At 604, the tier analyzer 124 may select a model to determine the response time of each of the BE servers 112 from a simulation model, a regression analysis model, or another similar model.

A decision occurs at 606 in the process 600 to determine whether (i) simulation or (ii) regression analysis is used to calculate the response time, where each model is discussed in turn.

i: Simulation

When simulation is selected at the decision 606, the process 600 may proceed to the simulation analysis at 608.

At 608(1), the tier analyzer 124 may generate a simulation model of each of the BE servers 112 with a load balancer. Given a complexity induced by the load balancer, instead of developing a closed-form model for a cluster of the BE servers 112, a simulator may be used to model each individual server with M/G/1 while simulating the behavior of the load balancer.

In some embodiments, the simulation 608 may be implemented as follows. Each server may maintain an average processing time (pt), average queue length ($q_{len}$), and a moving average of its current request rate $\lambda$. When a request arrives, the simulated load balancer may dispatch the request to one replication with minimized $q_{len} \times pt$ in each partition. The corresponding server may then update its $\lambda$, pt, and $q_{len}$. The simulator may output the processing time for each request after the request has been processed by the m partitions. In some embodiments, the simulator 608 may omit propagation delay between the load balancer (that is simulated) and partitions of the BE servers 112. The queue length ($q_{len}$) and processing time (pt) of each server may be available to the simulated load balancer. In practice, each server may periodically send $q_{len}$ and pt to the load balancer such as to avoid over use of network and/or server resources. In addition, request arrivals at each server may follow a non-exponential distribution because of the load balancing, which may distort a calculation of $q_{len}$ and pt. However, the simulation 608 may provide processing (response) times that are representative of the activity of the BE servers 112 during actual operation (as opposed to simulated operation).

At 608(2), the tier analyzer 124 may run the simulation analysis using the request rate from the operation 602 to determine a processing time (response) time for a partition, which may be aggregated for all the different partitions to determine a processing (response) time for the BE servers 112.

At 608(3), the tier analyzer 124 may determine a function for different request rates to enable expedited determination of the processing time.

ii) Regression Analysis

When the decision at 606 selects regression analysis, the process 600 proceeds to determine processing times using regression analysis 610.

At 610(1), the tier analyzer 124 may analyze service responses of each of the BE servers 112. With the regression analysis 610, the tier analyzer 124 may be used to create an approximate closed-form model of BE processing time.

At 610(2), the tier analyzer 124 may plot data points of each of the BE servers 112. The data points may include $\lambda$ and pt, where $\lambda$ and pt are the average request rate and average processing time of a cluster of the BE servers 112 for a particular request rate. Many different request rates may be used to create a large sample of the data points.

At 610(3), the tier analyzer 124 may determine a curve that has the best fit using least-squares from the data points ($\lambda$, pt). In some embodiments, the tier analyzer 124 may use a fitting function according to the following criterion: i) the pattern of the function is similar to that of the data points; and ii) the function is capable of optimization. However, many different types of curve fitting techniques may be employed at 610(3).

In some instances, the data that is plotted at the operation 610(2) may include noise. The noise may be smoothed using a median filter in order to observe trends in the data points. For example, when $\lambda$ is small, pt may increase slowly with $\lambda$. In some instances, after a turning point around 500 queries per second, a small increase of $\lambda$ may cause a drastic increase of pt, which is a pattern that is similar to that of the M/G/1 average processing time function of Equation 5 that may be solved for BE server processing time (BPT).

$$BPT(\lambda) = a + \frac{b\lambda}{c - \lambda} \quad \text{Equ. (5)}$$

In various embodiments, the tier analyzer 124 may use the BPT function of Equation 5 for curve fitting the data points. In some embodiments, the tier analyzer 124 may model the clusters of the BE servers 112 as a hypothetical M/G/1 queue. An additional benefit of the BPT function of Equation 5 is the convex shape of this function, which enables formulation of a request redirection problem as a convex optimization problem. Optimization will be discussed later in a following section.

As shown in FIG. 6, in some instances, both the simulation analysis and the regression analysis may be used concurrently or sequentially in the process 600. For example, in some instances the tier analyzer 124 may use the regression analysis of 610 in a request redirection optimization. Once a redirection strategy is determined, the tier analyzer 124 may use the simulator via 608 to estimate the pt of the BE servers 112.

At 612, the tier analyzer 124 may determine a processing (response) time for the BE servers 112 based on the inputted request rate at the operation 602.

At 614, the tier analyzer 124 may determine a caching probability. In some instances the processing time for a particular request may not be necessary when a request has a result that is stored in cache. For example, popular requests may have corresponding results stored in cache to enable a quick response with minimal or no processing time by the BE servers 112. Thus, at 614, a probability of the BE servers 112 may be determined that indicates processing of each partition of the BE servers. For example, when the BE servers 112 include three partitions, the first partition may be used 95%, the second at 70%, and the third at 20%, which may suggest that 80% of requests do not require use of the third partition. The probability may be used as a factor when calculating the aggregate QRT of 208 in the process 200.

In accordance with one or more embodiments, the tier analyzer 124 may model other clusters of the BE servers (e.g., mid-tier servers or other partitioned servers that perform data processing) in a similar as described in the process 600.

Figure 7:
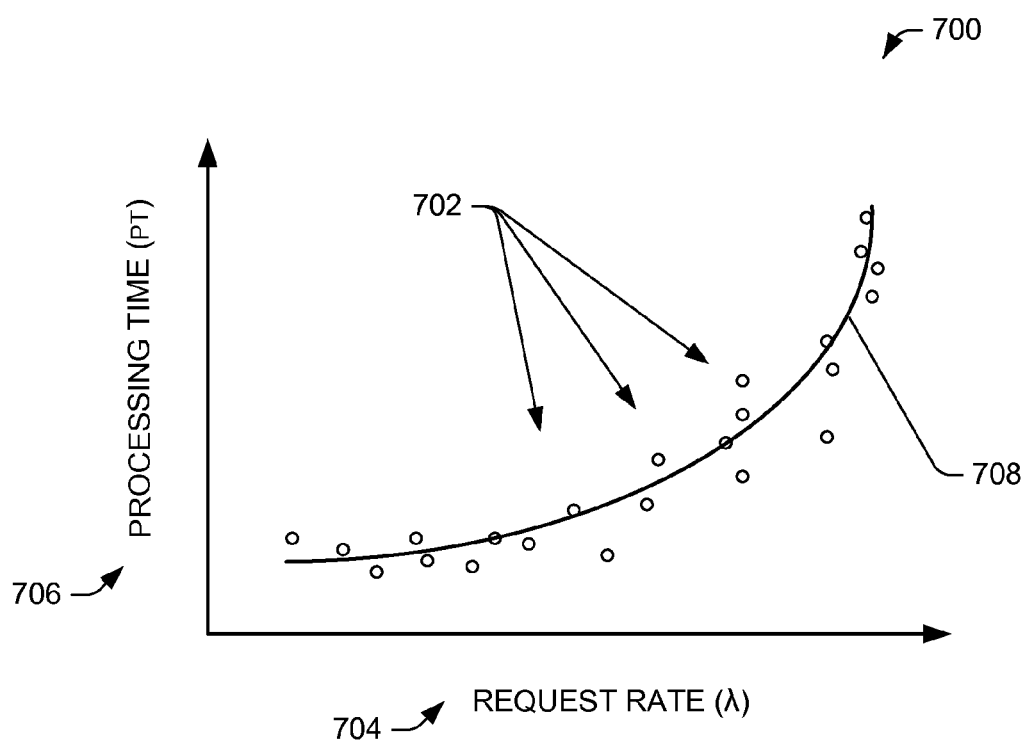
FIG. 7 is a chart showing illustrative regression analysis to fit a curve within data points that are representative of observed data from the partitioned tier of the multi-tier service in accordance with one or more embodiments of the disclosure.
Figure 8:
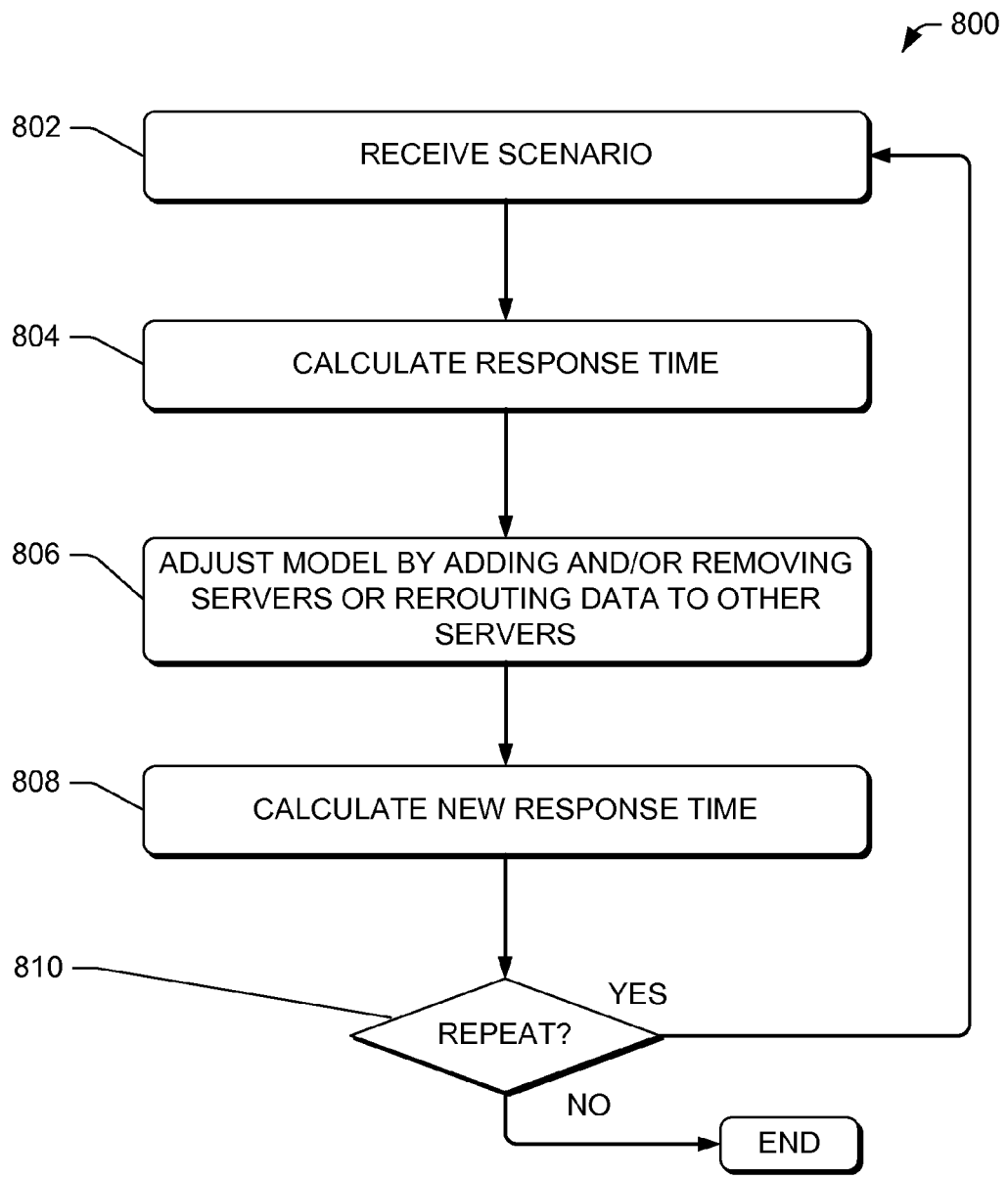
FIG. 8 is a flow diagram of an illustrative process of optimizing response time by modifying resource allocation of at least one tier of the multi-tier service in accordance with some embodiments of the disclosure.

FIG. 7 is a chart 700 showing illustrative regression analysis to fit a curve within data points that are representative of observed data points from the partitioned tier of the multi-tier service 102. As shown in FIG. 7, data points 702 may be plotted with respect to request time $\lambda$ 704 and processing time (pt) 706. A curve 708 may be fit to the data points 702, as discussed above in the operation 610 to enable determination of a function to approximate processing (response) time of each of the BE servers 112 based on the request rate from the operation 602.

Illustrative Optimizations

FIG. 8 is a flow diagram of an illustrative process 800 of optimizing response time by modifying resource allocation of at least one tier of the multi-tier service. The process 800 is a general frame work for optimizing the multi-tier service 102 to improve performance (e.g., low processing/response time, etc.) and/or to improve resource allocation (e.g., adding and/or reallocating servers, increasing network bandwidth, etc.).

At 802, the optimization module 126 may receive a scenario for analysis. The scenario may include variations on the server workloads of the FE servers 110 and the BE servers 112, which may include some of the servers being placed offline, reallocated to other tasks, and so forth.

At 804, the optimization module 126 may calculate response times based on the scenarios. The response times may be calculated in accordance with the processes 400, 500, and 600.

At 806, the optimization module 126 may adjust the multi-tier service 102 by adding servers (including reallocating resources) and/or rerouting data to other servers (which is explained in more detail below).

At 808, the optimization module 126 may calculate a new response time based on the adjustments at the operation 806. In this way, the multi-tier service 102 may be optimized to reduce response times for users that submit the requests.

At 810, the process 800 may be repeated to further refine the multi-tier service 102 and/or run another scenario.

In accordance with one or more embodiments, the optimization module 126 may apply a request redirection scheme using the process 800. The request redirection scheme may be designed to optimize the QRT for most or all of the requests sent to the multi-tier service 102.

Table 1, shown below, provides a framework for applying the request redirection optimization scheme.

TABLE 1

Inputs:

1. IP addresses: $IP = \{ip_i\}, i = 1 \ldots I$
2. Request rates: $Rate = \{r_i\}, i = 1 \ldots I$: requests rate from $ip_i$
3. DCs: $FE = \{fe_m\}, m = 1 \ldots M, BE = \{be_n\}, n = 1 \ldots N$
4. FE size: $Size = \{size_m\}, m = 1 \ldots M$: # of servers in $fe_m$
5. IP-FE delays: $DIP = \{dip_{im}\}$: delay between $ip_i$ and $fe_m$
6. FE-BE delays: $DDC = \{ddc_{mn}\}$: delay between $fe_m$ and $be_n$
7. FE model parameters: $PFE = \{\mu_m, cv_m\}, m = 1 \ldots M$: average and coefficient of variation of service time of $fe_m$
8. BE fitting function parameters: $PBE = \{a_n, b_n, c_n\}, n = 1 \ldots N$: parameters of $BPT(\lambda)$ function of $be_n$ Variables:

1. IP to FE and BE assignments: $X = \{\chi_{imn}\}, i = 1 \ldots I, m = 1 \ldots M, n = 1 \ldots N$, whether requests from $ip_i$ are assigned to $fe_m$ and $be_n$
2. Request rate at an FE server: $Y = \{y_m\}, m = 1 \ldots M$
3. Request rate at a BE cluster: $Z = \{z_n\}, n = 1 \ldots N$.

Procedure GlobalOptimize(IP, Rate, FE, BE, Size, DIP, DDC, PFE, PBE)

1: Objective:

$$\text{Minimize } \Psi(X) = \sum_i^I = 1 \sum_m^M = 1 \sum_n^N = 1 \; r_i \times \chi_{imn} \times \left( dip_{im} + ddc_{mn} + \mu_m + \mu_m(1 + cv_m^2) \frac{y_m \mu_m}{2(1 - y_m \mu_m)} + a_n + \frac{b_n z_n}{c_n z_n} \right)$$

2: Constraints:

1) $\forall \; i, m, n, \; \chi_{imn} = \{0, 1\}$.

2) $\forall \; i, \sum_m^M = 1 \sum_n^N = 1 \; \chi_{imn} = 1$

3) $\forall \; m, y_m = \left( \sum_i^I = 1 \; r_i \sum_n^N = 1 \; \chi_{imn} \right) / size_m$.

$\forall \; n, z_n = \sum_i^I = 1 \; r_i \sum_m^M = 1 \; \chi_{imn}$.

4) $\forall \; m, y_m < \frac{1}{\mu_m}$.

$\forall \; n, z_n < c_n$.

The inputs to the framework shown in Table 1 may include workload (inputs 1, 2), FE and BE configurations (inputs 3, 4), network transfer delays (inputs 5, 6), and FE and BE processing time models (inputs 7, 8). Variables $x_{imn}$ may determine whether the requests from $ip_i$ may be directed to $fe_m$ and $be_n$. Variables $y_m$ and $z_n$ may depend on $x_{imn}$ (constraint 3) and are introduced to transform an objective function into a convex function. Constraint 1 may ensure that the requests from an IP address will only be directed to one FE-BE pair. Constraint 2 may ensure that most or all of the requests will be serviced. Constraint 4 may ensure that no FE or BE will be overloaded. As discussed above, the objective of the optimization module 126 is to minimize the total QRT for all the requests.

In the objective function, $ddc_{mn}$ and $dip_{im}$ are the round trip times (RTTs) between the FE servers 110 and the BE servers 112 and between the user 106 (or the client devices 108) and the FE or BE servers. In some embodiments, $ip_i$ may use a content delivery network (CDN) node $cdn_j$ to reach $fe_m$. The optimization module 126 may use $dip_{im}$ to approximate the RTT between $fe_m$ and $cdn_j$ since $ip_i$ and $cdn_j$ are usually very close to each other, e.g., in the same city. The RTT between $ip_i$ and $cdn_j$ may be ignored in the objective function because they are controlled by a third-party CDN (thus not likely to be capable of optimization).

In accordance with some embodiments, the inputs to the optimization, $r_i$, $dip_{im}$, and $ddc_{mn}$ may be refreshed periodically during a period called "OptPeriod". The optimizations module 126 may determine that $dip_{im}$ and $ddc_{mn}$ are relatively stable during the OptPeriod because their first-order factor is a geographic distance of the network path. In contrast, $r_i$ may be much more volatile. When $\hat{r}_i$ is an instantaneous request rate from $ip_i$ during a short interval, then a volatility of $ip_i$ may be defined as a maximum difference between $r_i$ and $\hat{r}_i$ during the OptPeriod. Because the optimal solution may be computed based on $r_i$'s, it may not be optimal during a particular short interval due to volatility.

By disregarding constraint 1, the optimization problem above can be transformed into a convex optimization problem because, in a basic sense, the remaining three constraints are all linear while the objective function is a convex function. A convex optimization problem can be solved in polynomial time and its complexity is at a level roughly equal to that of linear programming (LP).

Besides minimizing the total QRT of all the requests, operators may be interested in defining other scenarios (objectives) at 810, e.g., minimizing the median or 95th percentile of QRT. These objective functions are generally non-convex and may be solved with an approximation algorithm. The current objective function may be used to minimize the total QRT and also reduce the n-th percentile in the CDF of QRT.

In accordance with some embodiments, the optimization module 126 may determine an optimal fractional solution to the problem. The optimization module 126 may use a heuristic to find an integer solution that is "close" to the optimal fractional one. The heuristic may begin with the optimal fractional solution. It may first sort IP addresses in a descending order according to their request rates to ensure that the IP addresses with high request rates have high priority during assignments. The heuristic may then assign each IP address to an FE-BE pair in the sorted order. Given $ip_i$ and its corresponding $x_{imn}$'s in the fractional solution, the heuristic may randomly assign $ip_i$ to $fe_m$ and $be_n$ that have enough remaining capacity with a probability proportional to $x_{imn}$.

As discussed above, the multi-tier service 102 may be hosted on many servers in various locations, where each location may include a data center (DC). In some embodiments, the multi-tier service 102 may run in multiple DCs around the world and may attract many users. The optimization framework may scale with the number of users and DCs. A complexity of the optimization problem may be determined by a number of independent variables I×M×N. M and N are bounded by the total number of DCs and are much smaller than I. Note that a set of IP addresses may be located in the same geographic region. They should have similar RTTs to any of the FE servers 110. The IP address may be grouped together without modifying the existing framework to significantly reduce the number of variables. The IP addresses may be grouped based on/24 prefixes When the optimization is performed online, the optimization module 126 may rely on history information to predict request rates. To estimate $r_i$ during an OptPeriod, the optimization module 126 may use the average request rate $r_i$ during a previous training period defined as "TrainPeriod". The choice of TrainPeriod may reflect a trade-off between the agility and age of a prediction. Using a smaller TrainPeriod, $r_i$ may be more recent and more volatile. In some embodiments, a two-hour training period may provide satisfactory results.

Prediction error of $ip_i$ may be defined as the difference between $r_i$ and $r_i$. Prediction errors may cause the load at a BE to deviate from its pre-computed load in the optimization or even exceed its capacity. An FE normally is unlikely to experience these consequences due to having a relatively light load. To avoid overload, the optimization module 126 may make a small improvement to the redirection logic of FE servers 110 in an online optimization. For example, $ip_i$ may be assigned to $fe_m$ and $be_n$ according to the optimization. When $fe_m$ receives a request from $ip_i$, it may direct the request to $be_n$ only if the latter has enough capacity to handle the request. Otherwise, $fe_m$ may use a "greedy" based redirection scheme to find an alternate BE for the request. An overload problem may be solved in a similar fashion as the prediction error discussed above.

In addition to performing optimizations of rerouting traffic, the process 800 may help planners answer various "what if" type questions. For example, by inputting different scenarios, the planners may be able to test performance of the multi-tier service 102 when it is subjected to a flash crowd (i.e., sudden and large increase in user requests), a DC failure, addition of new resources, and other changes to request rates and or server and/or network availability.

CONCLUSION

The above-described techniques pertain to capacity planning for data center services. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method comprising:
    determining a network transmission time of data transfers between an end user and each of a plurality of tiers of a multi-tier system;
    calculating a first response time of a first tier of the multi-tier system using a first model;
    selecting a second model that is different than the first model, wherein the second model is selected from a set of models that includes a load balancing simulation model and a regression analysis model;
    calculating a second response time of a second tier of the multi-tier system using the second model, the second tier including at least two partitions;
    determining an aggregate response time based on at least the network transmission time, the first response time, and the second response time; and
    reducing the aggregate response time based on a probability factor indicating a probability that at least one of one or more front end (FE) servers of the first tier or a back end (BE) server of the second tier fulfills a request using previously cached data.

2. The method as recited in claim 1, wherein the first model is a queuing model that calculates a single server response time based on an inter-arrival time that follows an exponential distribution as M/G/1.

3. The method as recited in claim 1, wherein the second model is the regression analysis model that uses regression analysis of historical response times of the second tier to generate a function to estimate the second response time.

4. The method as recited in claim 1, wherein the second model is the load balancing simulation model that uses simulation of the second tier to generate the second response time.

5. The method as recited in claim 1, further comprising adding additional resources to the first tier or the second tier to decrease the first response time or the second response time, respectively, based on an analysis of the aggregate response time.

6. The method as recited in claim 1, further comprising reallocating resources between at least one of the first tier or the second tier to reduce the aggregate response time over a predetermined period of time.

7. The method as recited in claim 1, wherein the multi-tier system is configured to receive a request and output results in response to the request.

8. The method as recited in claim 1, further comprising receiving a first request rate for the first tier and a second request rate for the second tier.

9. The method as recited in claim 1, wherein the aggregate response time is compared against a predetermined threshold response time to determine when additional resources are to be added to the multi-tier system.

10. A system for managing a multi-tier service, comprising:
    one or more processors; and memory to store computer readable instructions executable by the one or more processors, the instructions operable to:
    determine a network transmission time between at least two of a user, front end (FE) servers, and back end (BE) servers;
    determine a FE response time of the FE servers using a queuing model based on a request rate;
    select at least one BE response time model from a set of models that includes a load balancing simulation model and a regression analysis model;
    determine a BE response time of each partition of the BE servers using the selected at least one BE response time model;
    predict an aggregate response time based on the FE response time and each BE response time; and
    adjust the aggregate response time based on a probability factor indicating a probability that at least one of the FE servers or at least one of the BE servers fulfills a request using previously cached data.

11. The system as recited in claim 10, wherein the instructions are further operable to determine a query response time (QRT) as the aggregate of at least the network transmission time, at least one FE response time, and at least one BE response time.

12. The system as recited in claim 10, wherein the network transmission time is determined by:

calculating a round trip time (RTT),
determining a number of RTTs for the network transmission, and
calculating the product of the RTT and the number of RTTs.

13. The system as recited in claim 10, wherein the determining the FE response time includes employing a queuing model that calculates a single server response time based on an inter-arrival time that follows an exponential distribution.

14. The system as recited in claim 10, wherein the determining the BE response time includes:
modeling a load balancer to simulate workload assignment to one of the BE servers based on the lowest sum of queue length and processing time, and
calculating the response time using the load balancer implemented with a simulator or by regression analysis to determine the BE response time.

15. At least one computer-readable memory storing computer-executable instructions that, when executed on one or more processors, causes the one or more processors to perform acts comprising: calculating a response time for each of a plurality of tiers of a multi-tier service, using a response time model that is different for each of the plurality of tiers, wherein the response time model for at least one of the plurality of tiers concurrently uses a load balancing simulation model and a regression analysis model;
determining a network transmission time between the multi-tier service and an external node;
and calculating an aggregate response time as the sum of the response time for each of the plurality of tiers and the network transmission time; and
adjusting the aggregate response time based on a probability factor indicating a probability that at least one of one or more front end (FE) servers or at least one of one or more back end (BE) servers fulfills a request using previously cached data.

16. The at least one computer-readable memory as recited in claim 15, wherein at least one of the tiers of the plurality of tiers includes partitions that are implemented across two or more servers.

17. The at least one computer-readable memory as recited in claim 15, wherein the acts further comprise determining a new response time of one of the tiers of the plurality of tiers when one or more additional servers are allocated to the tier or removed from operation from the tier.

18. The at least one computer-readable memory as recited in claim 17, wherein the acts further comprise determining a new response time of one of the tiers of the plurality of tiers using an optimization value identified from a convex curve representative of modeled response times of the tiers.

19. The at least one computer-readable memory as recited in claim 15, wherein the plurality of tiers include: a non-partitioned tier as a front end (FE) tier that includes a FE response time modeled using a single server queuing model, and a partitioned tier as a back end (BE) tier that includes a BE response time that is modeled using at least one of the load balancing simulation model or the regression analysis model.

* * * * *